United States Patent [19]
Spaulding et al.

[11] Patent Number: 5,377,025
[45] Date of Patent: Dec. 27, 1994

[54] OPTIMAL COLOR QUANTIZATION FOR ADDRESSING MULTI-DIMENSIONAL COLOR CALIBRATION LOOK-UP-TABLE

[75] Inventors: Kevin E. Spaulding, Spencerport; Lawrence A. Ray, Rochester; James R. Sullivan, Spencerport, all of N.Y.

[73] Assignee: Eastman Kodak Company, Rochester, N.Y.

[21] Appl. No.: 980,860

[22] Filed: Nov. 24, 1992

[51] Int. Cl.⁵ .............................................. H04N 1/46
[52] U.S. Cl. .................................. 358/518; 358/519; 358/520; 358/523
[58] Field of Search ............... 358/518, 519, 521, 523, 358/515, 504, 524, 525, 520; 345/186–188, 199; 348/639, 646, 651, 660, 720, 405, 419

[56] References Cited
U.S. PATENT DOCUMENTS
5,162,925 11/1992 Takaoka et al. .................. 358/515

*Primary Examiner*—Scott A. Rogers
*Attorney, Agent, or Firm*—Thomas H. Close

[57] ABSTRACT

This invention minimizes the color errors associated with performing conversion and/or correction of color digital image data using multi-dimensional look-up tables of a limited size. By distributing the errors across the color gamut it is possible to reduce the average color error as well as the maximum color errors associated with linear or conventional linear or nonlinear, e.g. cube-root or logarithmic, remapping schemes. The resulting advantage will be color images with greatly reduced artifacts.

24 Claims, 6 Drawing Sheets

OPTIMAL COLOR QUANTIZATION FOR ADDRESSING MULTI-DIMENSIONAL COLOR CALIBRATION LOOK-UP-TABLE

The present invention relates to the field of digital color imaging systems, and more specifically to an optimal process of performing color calibration and/or color space transformations so as to minimize color errors.

BACKGROUND OF THE INVENTION

In a digital color imaging system, a color image is represented as a set of color picture elements ("pixels"). Each pixel has associated with it a set of color values which describe the color (hue, saturation and lightness) for that position in the image. The color values correspond to the color coordinates in some given color space. There are many different color spaces (e.g. RGB, CIE tristimulus (XYZ), CIELAB, CIELUV, CMY(K), etc.) which are commonly used. Some color spaces, such as XYZ, CIELAB, and CIELUV are device independent and will therefore give an absolute measure of the color for each pixel in the image. Others, such as RGB and CMY(K), are device dependent and can only be related to an absolute color value if the spectral characteristics of a specific device are known.

For many applications it may be necessary to be able to take color image data from one device and display, manipulate, and/or print it on another device which may have very different spectral characteristics. For this reason, it is often necessary to be able to take image data in one color space, and convert it to a different color space. For example, it may be required to take RGB data from an input scanner and convert it to a device independent space such as CIELAB. This device independent data could then be used by a variety of different output devices which could then convert the data to their own device dependent color space for display. This permits the various devices to be calibrated so that the image will have the same color appearance regardless of what output device is used.

The transformation from one color system to another relates the coordinates in one space to those in a different color space. In some cases, this color transformation may be as simple as a matrix multiplication, as in the case of transforming from RGB to XYZ. In other cases the transformation is more complex, such as when transforming CIELAB into CMY(K).

In a digital imaging system there is always some precision loss associated with the quantization of color data, moreover additional precision losses can occur each time the image data is transformed or manipulated. As a result, there will be quantization errors associated with the color values (i.e., instead of a continuum of color levels, there are only a limited number of discrete levels which can be represented with a given digital precision.) Quantization errors manifest themselves as image artifacts. For example, if an original image contains a smooth color gradient, the quantized image will appear to have "contours." The visibility of these artifacts is a function of both the size of the color errors, and the sensitivity of the human observer to the errors. For example, in RGB space, an error in one of the components of a given magnitude will be much more noticeable for darker colors than for lighter colors. So-called "uniform color-spaces" (such as CIELAB) attempt to map the color values into a coordinate system where distance corresponds to perceived color differences. Although these spaces are actually not entirely uniform, they are significantly more uniform than linear spaces such as XYZ.

In many cases, a digital imaging system not only has different color spaces associated with different steps in the imaging chain, but there may also be different precision levels associated with the data at each step. For example, it may be necessary to reduce the number of digital levels in the data at some point in the process due to limitations on the number of bits which can be transmitted across some data path, or the memory size available for a look-up-table. Since the original quantized data must be resampled to reduce the number of color levels, this process can be called "secondary quantization."

The simplest way to reduce the number of digital levels is to resample the range of input levels linearly, (or equivalently to use only the most significant data bits). However, if this is done in a non-uniform color space such as RGB or XYZ, the errors introduced at the dark end of the input range may be quite objectionable, while the errors at the bright end of the input range may be so small that they are imperceptible. By using a non-linear mapping of the input to output levels it is possible to minimize the overall color error by balancing the perceived color errors over the color gamut. Logarithmic functions and various power laws, e.g. cube-root, etc., have been suggested as possible non-linear mapping functions in the past (M. I. Sezan, K. L. Yip and S. Daly, "Uniform perceptual quantization: applications to digital radiography," IEEE Trans. Sys. Man. Cyber. SMC-17, 622-634(1987)). Although these approaches are intuitively appealing because they attempt to model the non-linearity of the human observer, it can be shown they are not optimal. These approaches tend to over sample the darker end of the input range and usually result in under utilization of the possible output levels, i.e. input level 0 may map into output level 0, and input level 1 may map into output level 5 resulting in output levels 1 through 4 never being used. As a result, somewhere the color errors must be larger than necessary. This invention will map the input levels into a specified number of output levels in the optimum way so as to minimize the perceived color errors which are created by this secondary quantization process.

The problem of finding the best non-linear remapping has been addressed by Ray, Heckman, and Sullivan for the case of the optimum RGB secondary quantization for color soft video displays (L. Ray, C. Heckman and J. Sullivan, "Requantization of Color imagery," U.S. patent application Ser. No. 07/687,152). They show that the optimum non-linear secondary quantization function for reducing the number of digital levels in an RGB image can be determined by a global non-linear optimization technique.

This invention specifically addresses the problem of determining the optimum secondary quantization for the case of addressing a multi-dimensional color calibration table. This problem is important because many of the color space transformations which are necessary in a color digital imaging system are frequently implemented using a 3-dimensional look-up table (see U.S. Pat. No. 4,500,919). The memory requirements for the look-up table are directly related to the number of digital levels in the input color space. For example, if the input color space was RGB and the data was stored as 8-bit value (256 different levels) the look-up table would require $2^{3*8}$ ($=2^{24}=16,777,216$) different entries. If the color value stored at each address in the look-up table was given by three 8-bit output values this would imply that 48 MBytes of memory would be required to store the table. For many applications, this memory requirement may be impractical due to cost constraints. For this reason it is often necessary to reduce the number of levels in the input color data before addressing the color-calibration look-up table. For example, reducing the number of levels in the input data from 256 levels (8-bit addresses) to 64 levels (6-bit addresses) reduces the look-up table memory requirements from 48 MBytes to 786 KBytes. The output color corresponding to input colors which are intermediate to those stored in the look-up table can be generated by selecting the look-up table entry corresponding to nearest input color value, or by various methods of multi-dimensional interpolation (see U.S. patent application Ser. No. 07/696,299 entitled "System for performing Linear Interpolation" by G. Newman). The method which is used to quantize the input color space to the smaller number of levels dramatically effects the perception of color artifacts generated by the system. This is true whether nearest-neighbor selection or more sophisticated methods of multi-dimensional interpolation are used.

The present invention is significantly different from the earlier invention of Ray et. al., in several respects. In the case of Ray, et. al., the color data exists in a specific color space and the desired goal is to reduce the precision of that data while reining in the same color space. In this case, the goal is to convert the data from an initial color space into a different color space using an intermediate multi-dimensional look-up table. The reduction in the precision of the data is therefore not an end, but a means. Another major difference is that in the case of Ray, et. al., the individual components of the color value are considered independently, although the color errors are computed from the combined values. In the present invention, the different color components are correlated in the sense that each position in the multi-dimensional look-up table is addressed by all of the components in the input space.

SUMMARY OF THE INVENTION

This invention is a method for converting color image data in one color space to a different color space using a multi-dimensional color-calibration look-up-table of a limited size with or without multi-dimensional interpolation in a way that minimizes color errors.

Because of memory size limitations for the look-up table it is often necessary to reduce the number of look-up table entries. This invention reduces to practice a method for establishing and implementing the optimum non-linear mapping for each channel in the input color space which minimizes the overall visibility of color errors.

The preferred method of the invention for minimizing the color errors between color input signals and color output signals of a color transformation system is comprised of the steps of:

quantizing received color input signals representing a color input image to provide color signals having different quantization levels than said color input signals which levels are chosen so as to provide a minimum total color error between the received color input signals and the color output signals of the color transformation system; and retrieving output color signals stored in a color calibration look-up table as a function of the differently quantized color signals.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 1:
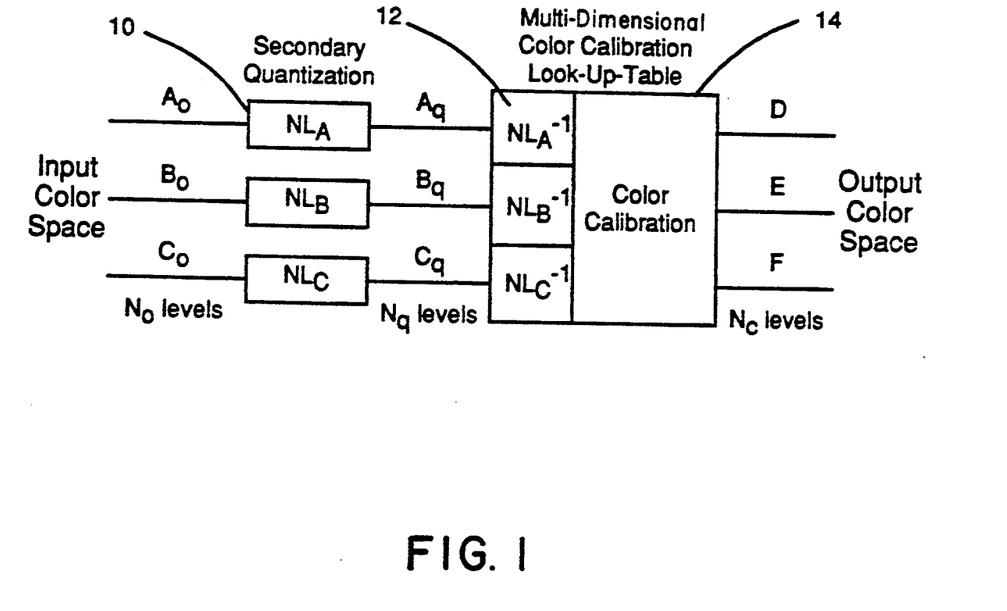
FIG. 1 is a generic block diagram of a portion of a system in which the present invention may be implemented.

Referring to FIG. 1, in a generalized environment input color image data exists in some multichannel color space, denoted as ABC, where ABC may represent RGB, XYZ, CIELAB, CIELUV, CMY(K), etc. The color coordinates in this space are known with some precision specified by the number of digital levels, $N_o$. It is desired to convert the color information for some image into another color space, denoted as DEF, with some precision specified by the number of digital levels in the output color space ($N_c$ levels). The color conversion is carried out using a group of quantizers 10 which quantize the input color signals $A_o$, $B_o$, and $C_o$ to $N_q$ levels providing the color signals $A_q$, $B_q$, and $C_q$, which are used to address a multi-dimensional color-calibration look-up table 14. The number of dimensions for the look-up table 14 corresponds to the number of color parameters in the input color space. Usually this is three dimensions, with the exception of CMYK space which would have four dimensions. Incorporated within the look-up table 14 are inverse non-linear functions 12 for each of the color channels. These are inverses of the non-linearities of the quantizers 10 and are labeled $NL_A^{-1}$, $NL_B^{-1}$, and $NL_C^{-1}$.

The color-calibration table 14 contains precalculated output color values for every possible combination of input color values. This approach is implemented in digital hardware and permits fast "computation" of the color transformation even when the actual mathematical equations relating the two color spaces are very complex. Due to the memory requirements for the look-up table 14, the precision of the quantized input color values will be limited to some value given by the number of quantized digital levels $N_q$. In some cases, the number of digital levels for each channel of the input color space may be different, e.g., channel B may have $N_{qB}=64$ levels and channels A and C may have $N_{qA,C}=32$ levels.

To reduce the number of levels in the input color space from $N_o$ to $N_q$, it is necessary to map the input color values $A_o$, $B_o$, and $C_o$ through discrete functions which will compress the range of the color values. This is accomplished by the quantizers 10 that function to provide channel-independent non-linearities $NL_A$, $NL_B$, and $NL_C$. These non-linearities will map the $N_O$ input levels into $N_q$ output levels by grouping ranges of input color levels together. For example, input color levels 0 through 3 might be grouped into the first quantized color level, input color levels 4 through 6 might be grouped together into the second quantized color level, etc. Each of the quantizers is equipped with a plurality of bins corresponding in number to the number of quantization levels $N_q$. The boundaries between the different quantization bins will be referred to as the "decision values." In practice, these non-linearities are implemented by one-dimensional look-up tables which simply store the quantized color level for each input color level. In general, the non-linearities for each color channel will be allowed to be different.

The output color space values, stored in the multi-dimensional color-calibration look-up table for each different set of quantized input color values, are calculated in two steps. First, the inverse of the non-linearities associated with the quantizers 10 must be calculated to recover the approximate original input color values. These recovered values will be called the reconstruction values. Second, the color values in the output color space which correspond to the reconstruction color values must be calculated. Since the output color space values stored in the color-calibration look-up table 14 have an associated precision given by the number of levels $N_c$, the output color values must be rounded to the nearest quantized level. As a first approximation, the reconstruction values can be taken to be the center of each of the quantization bins, but the optimal values are the ones which will minimize color errors. The optimization method will be discussed later in further detail. Multi-dimensional interpolation can also be used to model and reconstruct intermediate output values in each color-calibration look-up table bin.

The main problem to be solved by the present invention is that of achieving a minimum color error as the signals representing the input color space are processed through a digital imaging system of the type that incorporates quantizers for the purpose of addressing a multi-dimensional color calibration look-up table. In other words the output color signals from such a system will have minimum color errors with respect to the input color signals. This problem is solved by implementing an optimal set of non-linear mapping functions which reduce the number of digital levels in the input color space from $N_O$ to $N_q$, or equivalently by implementing optimal decision levels for the quantizers 10. The optimum choice of the non-linear mapping functions will be the one which minimizes observable color errors between the color values in the input color space and the corresponding color values in the output color space. A cost function is defined by combining these color errors over all colors in the input color gamut to provide a measure of the overall system performance. The input color gamut is defined to be the set of allowable colors in the input color space. The cost function is thus a measure of the total color error of the system. An optimization process is used to determine the system configuration which minimizes the value of the cost function. The cost function used in the preferred embodiment is the average color error for all colors in the input color space, where the color error for each input color value is given by the Euclidean distance in a "visually uniform color space" such as CIELAB space:

$$\Delta E = \sqrt{(L_c^* - L_0^*)^2 + (a_c^* - a_0^*)^2 + (b_c^* - b_0^*)^2} \quad \text{Eq. (1)}$$

In this equation $(L_O^*, a_O^*, b_O^*)$ is the input color value, and $(L_c^*, a_c^*, b_c^*)$ is the color value in the output color space, where both colors have been mapped into the CIELAB color space for comparison. Mathematically, the cost function can be expressed by the integration of Eq. (1) over the input color gamut of the system:

$$\text{total color error} = \left[ \frac{1}{V} \int\int\int_{\text{gamut}} P(A_o,B_o,C_o)(\Delta E(A_o,B_o,C_o))^K dA_o dB_o dC_o \right]^{1/K} \quad \text{Eq. (2)}$$

where Ao,Bo,Co are the input color values, P(Ao,Bo,Co) is a function that weights the contribution of each input color, $\Delta E$(Ao, Bo,Co) is the color error as a function of each input color, V is the volume of the color gamut, and K is a constant. When the input color space consists of a discrete number of color levels, the integration of Eq. (2) can be replaced by a summation over all colors in the input color gamut:

$$\text{total color error} = \left[ \frac{1}{N} \Sigma \Sigma \Sigma_{\text{gamut}} P A_o B_o C_o (\Delta E_{A_o B_o C_o})^K \right]^{1/K} \quad \text{Eq. (3)}$$

where Ao,Bo,Co are the input color values, $P_{Ao,Bo,Co}$ is a function that weights the contribution of each input color, $\Delta E_{Ao,Bo,Co}$ is the color error for each input color, N is the number of colors in the input color gamut, and K is a constant. This color error can be calculated for a given set of non-linearities, and a specified output color space. Alternate embodiments would include performing error calculations in other "uniform color spaces" such as CIELUV, weighting the color errors within the color gamut by the probability of that color occurring, or using other forms for the cost function such as minimizing the maximum color error, or equalizing the color errors over all regions of the color gamut.

The process of determining the non-linearities that minimize the cost function is nontrivial because of the dimensionality of the problem. The number of variables in the optimization for each channel of the input color space is given by the number of decision values ($N_q-1$). In addition, the position of the reconstruction values within each bin can be treated as variables in the optimization process. The minimum color error is determined using a non-linear optimization technique such as the steepest-descent method which works quite well and converges reliably for this problem. This method involves calculating the change in the value of the cost function for each perturbation of the decision values involving the reduction of the width of one quantizer bin by one input level, and the increase of the width of another bin in the same quantizer by the same amount. The perturbation which provides the largest improvement in the cost function is chosen, and the process is repeated for each channel until the color error is minimized. Generally, convergence is reached in less than 100 iterations for typical examples. Other optimization techniques such as simulated annealing or genetic algorithm could also be used.

Figure 2:
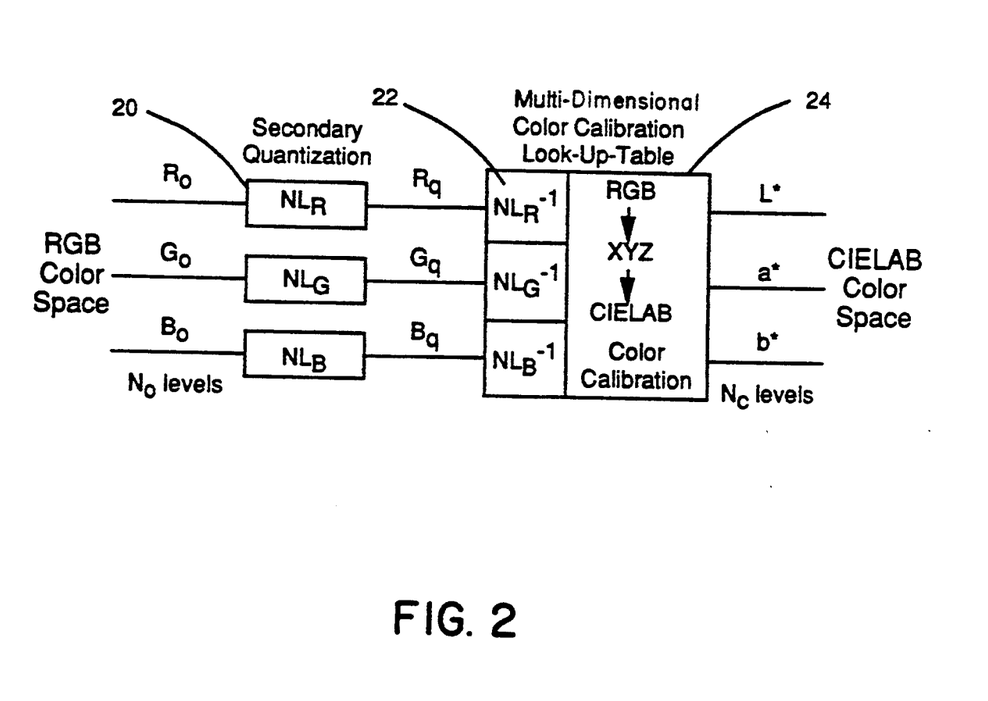
FIG. 2 is a block diagram of a portion of a system that incorporates the present invention to convert from an RGB color space to the CIELAB color space.

Referring to FIG. 2, the method of the present invention is shown applied to a system that converts RGB signals to the CIELAB color space. The input signals $R_o$, $G_o$ and $B_o$ represent 8-bit RGB color values that are obtained from a device such as color input scanner (not shown), and are to be converted to 8-bit CIELAB color values for storage and/or transmission to other systems. This example is relevant to all standard color interchange systems such as color facsimile. Due to memory limitations, the size of the color-calibration look-up table 24 may be limited to 15-bit addresses or $2^{15}$ table entries. One way to allocate the look-up table memory would be to assign 5-bits of the address (or 32 levels) to each of the channels of the RGB color signal. The quantization of the RGB input color values must, therefore, be reduced from 256 levels ($N_o$) to 32 levels ($N_q$). This is accomplished by the quantizers 20. If the number of color levels were reduced by simply grouping the input color levels linearly, which is equivalent to using the most significant bits of the $R_o$, $G_o$, and $B_o$ input color values, the color errors in the low intensity region of the color gamut would be quite objectionable. The errors for the brighter colors, however, would be much smaller. Using Eq. (3) to calculate the value of the cost function gives a value of 2.2 for a typical scanner RGB color space.

$$\begin{bmatrix} R_o - G_o \\ G_o \\ B_o - G_o \end{bmatrix} = \begin{bmatrix} 1 & -1 & 0 \\ 0 & 1 & 0 \\ 0 & -1 & 1 \end{bmatrix} \begin{bmatrix} R_o \\ G_o \\ B_o \end{bmatrix}$$

Figure 3:
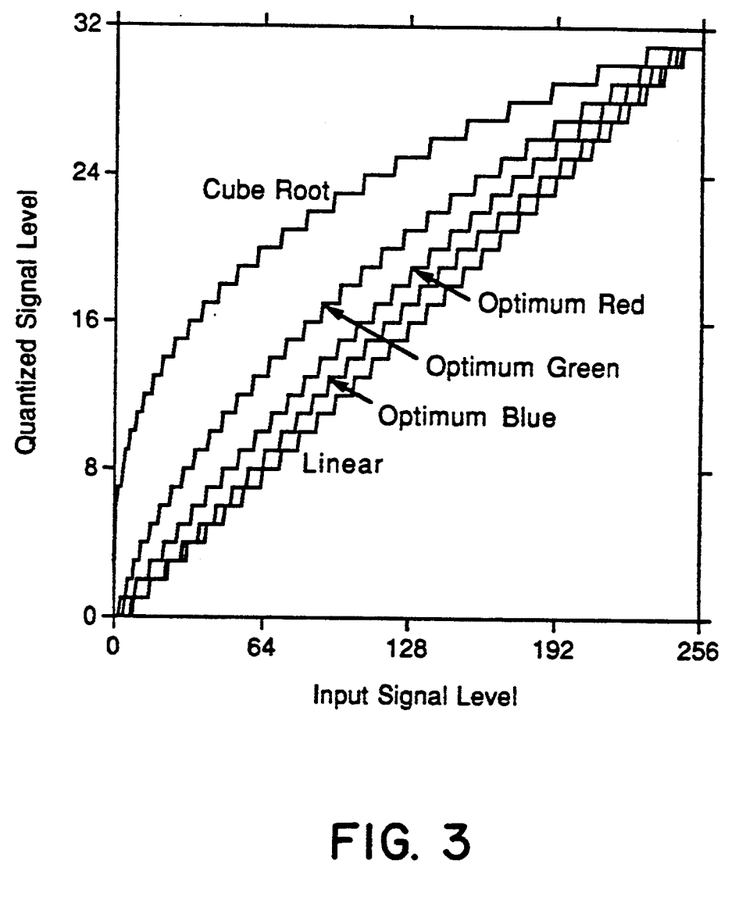
FIG. 3 represents the quantizer output levels as a function of input levels obtained by the present invention as compared against conventional cube root and linear quantizer output levels.
Figure 4:
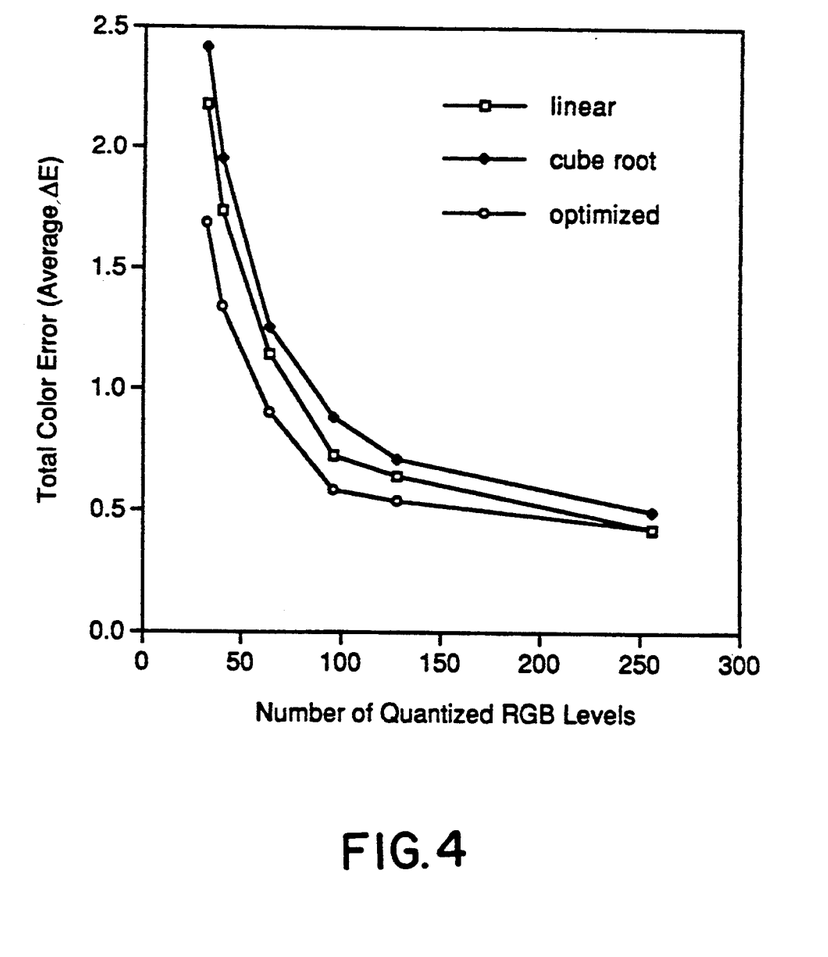
FIG. 4 is a graph that compares the average color errors for the present invention against conventional cube root and linear quantizer color errors as a function of the number of quantizer levels.

If cube-root functions were used for the non-linearities of the quantizers 20 to approximate the non-linearity of the human visual system, the color errors would be more uniform over the color gamut, but since a significant nun%her of the quantized color levels are unused the overall color error would actually be larger and would be very objectionable. The value of the cost function in this case would be equal to 2.4. If the optimum non-linearities were selected in accordance with the present invention, the value of the cost function would be reduced to a value of 1.7. The color errors in this case are quite uniform over the input color gamut and are much smaller than the errors observed in either the linear or cube-root examples. This represents a substantial improvement in the color fidelity of the image. The optimum non-linearities for each of the RGB color channels are shown in the graph of FIG. 3. Also shown are the curves illustrating the non-linearities for the linear and cube-root examples. Note that the optimum remapping compresses the dark color levels, but not so severely that output levels are skipped as in the cube root case. FIG. 4 is a graph illustrating the color error as a function of the number of quantized color levels. This graph demonstrates that the optimum secondary quantization approach offers large improvements over the linear and cube root approaches for the entire range of precisions investigated.

Figure 5:
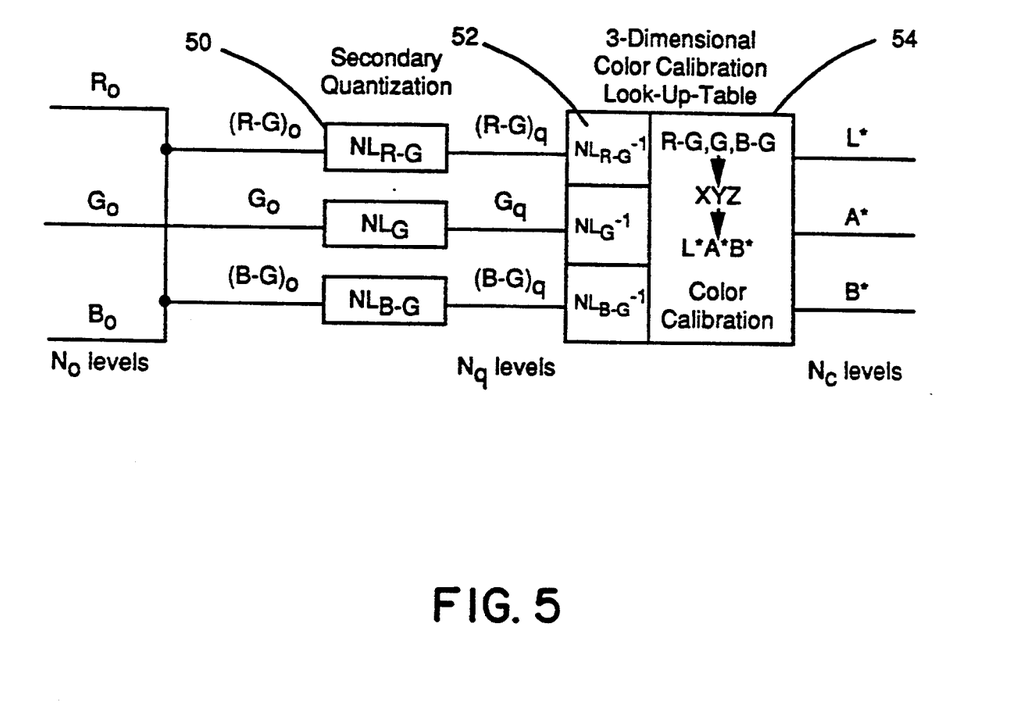
FIG. 5 is a block diagram of a portion of a system that incorporates the present invention to convert from an RGB color space to the CIELAB color space using an intermediate transformed color space.

Another implementation of interest is shown in FIG. 5. In this implementation the configuration of FIG. 2 is modified such that the differences between the R and G signals, and the B and G signals are provided as inputs to the quantizers 50. This could be implemented using a matrix multiplication as shown below.

$$\begin{bmatrix} R_o - G_o \\ G_o \\ B_o - G_o \end{bmatrix} = \begin{bmatrix} 1 & -1 & 0 \\ 0 & 1 & 0 \\ 0 & -1 & 1 \end{bmatrix} \begin{bmatrix} R_o \\ G_o \\ B_o \end{bmatrix}$$

This arrangement illustrates the possibility of extending the teachings of the present invention to accommodate any method of combining multichannel input color signals.

Figure 6:
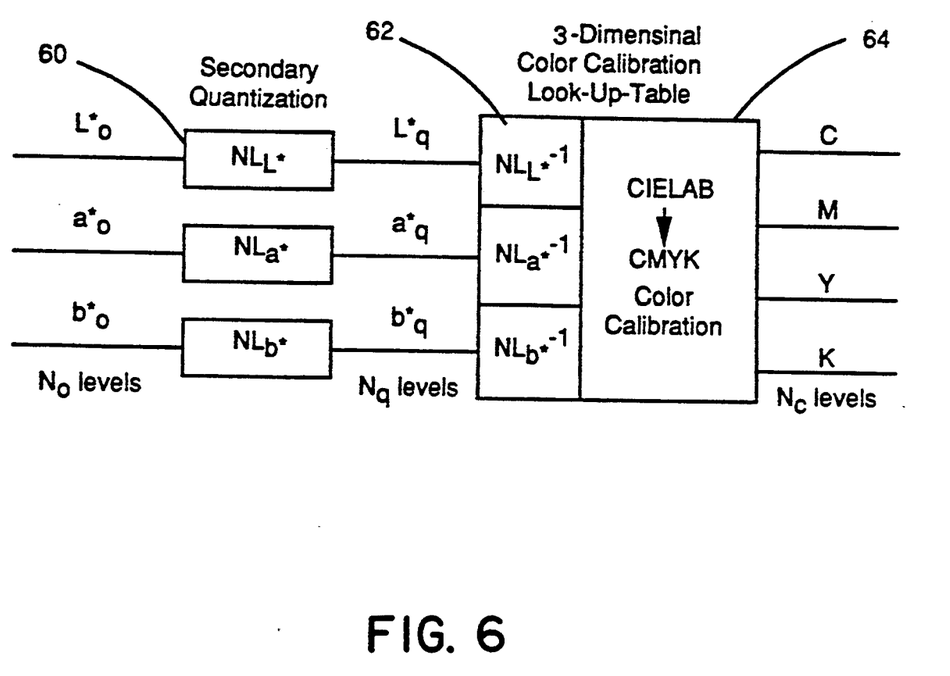
FIG. 6 is a block diagram of a portion of a system that incorporates the present invention to convert from the CIELAB color space to a printer CMYK color space.

FIG. 6, shows an implementation having particular utility for a general color printer. Here, the input color values are 8-bit CIELAB values, and the desired output color values are 8-bit CMYK control signals which are used to drive a four-color output printer.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:

1. An arrangement for minimizing the color errors between color input signals and color output signals of a color transformation system comprising:
    quantizing means for receiving color input signals representing a color input image and for providing as outputs, color signals having a different number of quantization levels than said color input signals which levels are chosen so as to provide a minimum total color error between the received color input signals and the color output signals of the color transformation system; and
    a color calibration look-up table means receiving as inputs the differently quantized color signals for converting said differently quantized color signals to the color output signals.

2. A method for minimizing the color errors between color input signals and color output signals of a color transformation system comprising the steps of:
    quantizing received color input signals representing a color input image to provide color signals having different quantization levels than said color input signals which levels are chosen so as to provide a minimum total color error between the received color input signals and the color output signals of the color transformation system; and
    retrieving output color signals stored in a color calibration look-up table as a function of the different quantized color signals.

3. The method of claim 2 wherein the total color error is defined by comparing the input color signals and the output color signals in a con, non color space.

4. The method of claim 3 wherein the total color error is calculated by combining the color errors for all colors in the input color gamut.

5. The method of claim 4 wherein the total color error is combined by averaging the color errors for all colors in the input color gamut.

6. The method of claim 5 wherein the averaging is performed with an integration of the color error over the input color gamut.

7. The method according to claim 6 wherein the integration of the color error is performed by the function;

total color error =

$$\left[ \frac{1}{V} \int \int \int_{gamut} P(A_o,B_o,C_o)(\Delta E(A_o,B_o,C_o))^K dA_o dB_o dC_o \right]^{1/K}$$

where Ao,Bo,Co are the input color values, P(Ao, Bo,Co) is a function that weights the contribution of each input color, $\Delta E(A_o,B_o,C_o)$ is the color error for each input color, V is the volume of the color gamut, and K is a constant.

8. The method of claim 5 wherein the averaging is performed by a summation of the color errors for all input colors in the input color gamut.

9. The method according to claim 8 wherein the summation of the color error is performed by the function;

$$\text{total color error} = \left[ \frac{1}{N} \Sigma \Sigma \underset{gamut}{\Sigma} P_{A_o B_o C_o}(\Delta E_{A_o B_o C_o})^K \right]^{1/K}$$

where Ao,Bo,Co are the input color value, $P_{A_o,B_o,C_o}$ is a function that weights the contribution of each input color, $\Delta E_{A_o,B_o,C_o}$ is the color error for each input color, N is the number of colors in the input color gamut, and K is a constant.

10. The method of claim 3 wherein the total color error is equal to the largest color error for all colors in the input color gamut.

11. The method of claim 2 wherein the minimum total color error is computed using a non-linear optimization process.

12. The method according to claim 11 wherein the optimization process is a steepest descent technique.

13. The method according to claim 11 wherein the optimization process is a stochastic optimization process.

14. The method according to claim 13 wherein the optimization process is simulated annealing.

15. The method according to claim 4 wherein the color error for each color in the input color gamut is determined by the Euclidean distance in a uniform color space.

16. The method according to claim 2 wherein the input color space is a device dependent color space and the output color space is a device independent color space.

17. The method according to claim 16 where the device dependent color space is an RGB color space and the device independent color space is the CIELAB color space.

18. The method according to claim 2 wherein the input color space is a device independent color space and the output color space is a device dependent color space.

19. The method according to claim 18 where the device independent color space is the CIELAB color space and the device dependent color space is a CMY(K) color space.

20. The method according to claim 2 wherein the input color space is a device dependent color space and the output color space is a device dependent color space.

21. The method according to claim 20 where the input color space is an RGB color space and the output color space is a CMY(K) color space.

22. The method of claim 2 and further comprising the step of:
combining the input color signals to form a modified input color space before quantizing the color signals.

23. The method according to claim 22 wherein the modified input color signals are calculated by multiplying the input color signals by a matrix.

24. The method according to claim 2 wherein a multi-dimensional interpolation technique is used to calculate values that are intermediate to the color signals stored in the color calibration look-up table.

* * * * *